Jan. 28, 1958     H. FUHRKE     2,821,178
VALVE CONTROL FOR INTERNAL COMBUSTION ENGINES
Filed Sept. 20, 1955
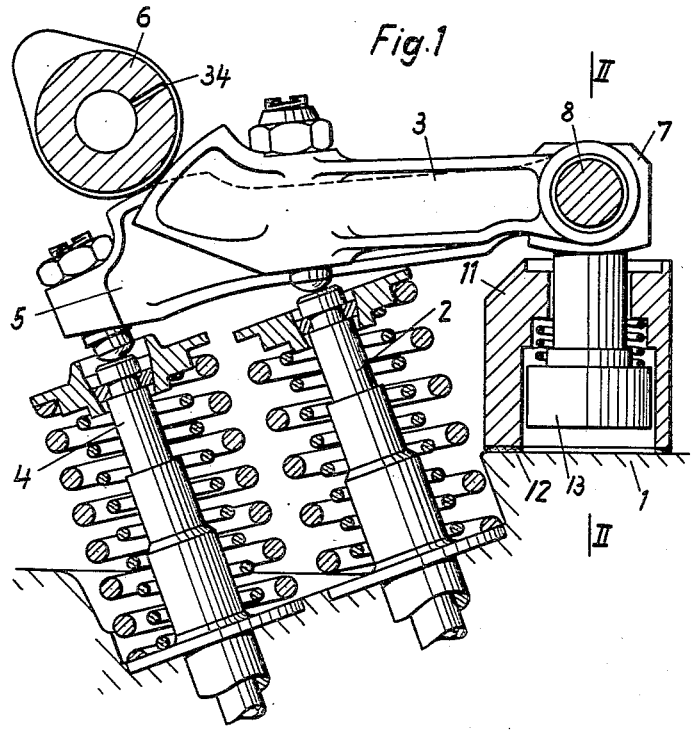
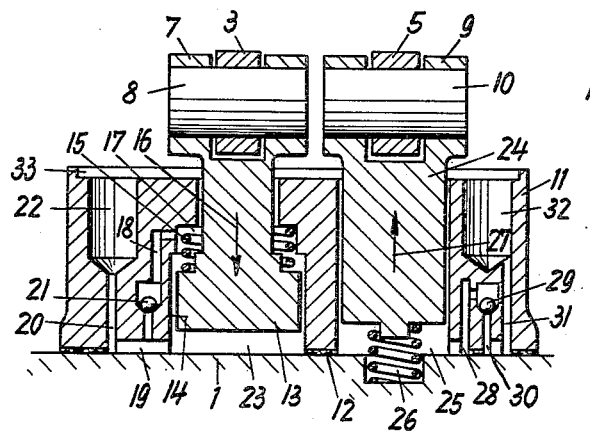
INVENTOR
HARTMUT FUHRKE
BY *Dicee and Craig*
ATTORNEYS United States Patent Office 2,821,178
Patented Jan. 28, 1958

2,821,178

VALVE CONTROL FOR INTERNAL COMBUSTION ENGINES

Hartmut Fuhrke, Fellbach, Kreis Waiblingen, Germany, assignor to Daimler-Benz Aktiengesellschaft, Stuttgart-Unterturkheim, Germany Application September 20, 1955, Serial No. 535,421

Claims priority, application Germany September 22, 1954

6 Claims. (Cl. 123—90)

The present invention relates to a valve control mechanism for internal combustion engines, and more particularly to hydraulic adjusting means for eliminating any valve play. The invention is especially concerned with such valve control mechanism in which between the cams and valves rocking levers are provided, the pivotal axes of which are automatically adjustable so as to compensate any valve clearance continuously.

It is an object of the present invention to provide the hydraulic adjusting means with check valves, preferably of the ball type which are not subjected to any spring action, and to connect the adjusting means through such check valves with oil chambers which are not under pressure and which form an oil sump to collect the lubricating oil which might flow or be thrown off the individual parts of the control mechanism.

Prior to this invention the hydraulic adjusting means of such valve control mechanism were either connected to the oil pressure circuit of the combustion engine or provided with their own oil supply. This entailed considerable difficulties in preventing oil leaks which could only be overcome by making the individual parts of the adjusting device extremely accurate so as to fit together substantially without any play.

It is another object of the present invention to overcome this disadvantage of prior hydraulic adjusting devices by the mechanism as described which eliminates all difficulties arising from oil leaks and a loss in oil pressure and permits the individual parts of the adjusting device to be made without such great accuracy as previously required.

It is a further object of the present invention to combine the control valves of the adjusting means with the check valves between the oil collecting chambers and adjusting means in one set of valves which carry out both functions, and thus to produce an extremely simple and inexpensive mechanism. Furthermore, it will be possible according to the invention to design the housings of the rocker bearings so that they, themselves, will form the control openings of the adjusting means.

Another feature and advantage of the present invention is that two or more adjusting devices may be connected to a single oil collecting chamber. Furthermore, in control devices for adjusting the pivotal axes of the rocking levers, the oil collecting chambers may thus also be provided within the bearing blocks which carry the devices.

Further objects, features, and advantages of the present invention will appear from the following detailed description thereof, as well as from the accompanying drawings, in which Fig. 1 shows a cylinder head, partly in cross section, with valves which are actuated by a camshaft by means of rocking levers; while Fig. 2 shows a cross sction taken along line II—II of Fig. 1 through the bearing support of the rocking levers and the hydraulic adjusting means provided therein.

Referring to the drawings, the cylinder head 1 of an internal combustion engine contains the valves 2 and 4 which are actuated through rocking levers 3 and 5, respectively, by the camshaft 6. As illustrated particularly in Fig. 2, rocker 3 is pivotable within a forked bearing 7 about a pin 8, while rocker 5 is pivotable within a forked bearing 9 about a pin 10. Bearings 7 and 9 are supported by a bearing block 11 which is secured with an intermediate gasket 12 on cylinder head 1. Bearings 7 and 9 together with bearing block 11 form hydraulic means for adjusting the rocker bearings so as to eliminate any play between the valves, rockers, and cams. Bearing 7 is provided with a plunger 13 which is slidable within a cylinder 14 in the bearing block 11. A spring 15 acts upon plunger 13 in the direction of the arrow 16. The annular portion 17 of cylinder 14 above plunger 13 communicates with an oil collecting chamber 22 through a system of ducts 18, 19, and 20 which also contain a ball check valve 21. Ducts 19 and 20 which are not under pressure also connect the cylinder 23 below plunger 13 with the oil collecting chamber 22.

The operation of the adjusting mechanism for rocker 3 and valve 2 is as follows:

If there should be any play between valve 2 and rocker 3, or between the latter and the base circle described by the camshaft, spring 15 will press plunger 13 and thus the forked bearing 7 in the direction of arrow 16 until all the play has been eliminated. Although the oil in cylinder 23 will thereby be forced into the chamber 22, a suction head will at the same time be formed in the annular cylinder portion 17 which replenishes the oil cushion by drawing oil not under pressure from chamber 22 through check valve 21.

Bearing 9 is mounted on a plunger 24 which is slidable in a cylinder 25. A spring 26 acts on plunger 24 tending to move the same in the direction of arrow 27. Cylinder 25 communicates with an oil collecting chamber 32 through ducts 28, 30, and 31 in which a ball check valve 29 is provided.

If any play should occur between valve 4 and rocker 5, or between the latter and the base circle described by the camshaft, spring 26 will press plunger 13 and thus the forked bearing 9 in the direction of arrow 27 until all the play has been eliminated. This again produces a suction head in cylinder 25 which replenishes the oil cushion therein by drawing new oil from chamber 32 through check valve 29.

While the cams 6 ascend, the rocker bearings 7 and 9 are subjected to forces which are directed opposite to the direction of arrows 16 and 27 and are larger than the force of springs 15 and 26. Thus, they will produce a positive pressure in chambers 17 and 25 which, in turn, will close check valves 21 and 29. The oil may then only escape from chambers 17 and 25 through the play between plungers 13 and 24 and their cylinder walls. This play may be made of a size so as to obtain either a hard or smooth hydraulic control, the latter usually being preferred. The power reduction by rockers 3 and 5, on the one hand, and the relatively large cross-sectional area of the oil cushion chambers 17 and 25, on the other hand, permit the pressure of the oil cushions to be very low and the flow of oil for a certain hydraulic hardness to be very high, which means the plungers 13 and 24 may be fitted in their cylinders with rather large play and that any danger that the oil ducts and check valves 21 and 29 might become clogged will be absolutely avoided by the resulting high velocity of the oil flow.

The oil which will thus be forced out upwardly between plungers 13 and 24 and the cylinder walls will collect in a recess 33 at the upper end of bearing block 11 and flow to the oil collecting chambers 22 and 32. Any oil which might escape downwardly from plunger 13 will pass directly into chamber 22. Any loss of oil which might occur in the operation of the mechanism will be automatically and continuously replenished by such oil as may be flowing or splashing from other points of the mechanism, for example, from the cam-shaft 6 through a bore 34, as shown in Fig. 1. Such oil will be automatically collected in the recess 33 and then flow into the chambers 22 and 32.

Although my invention has been illustrated and described with reference to the preferred embodiments thereof, I wish to have it understood that it is in no way limited to the details of such embodiments or to the specific example described, but is capable of numerous modifications within the scope of the appended claims.

Having thus fully disclosed my invention, what I claim is:

1. A valve control mechanism for internal combustion engines having cams and valves operated by said cams, comprising rocking levers disposed between said cams and valves, hydraulic means for adjusting the position of the rotary axis of said rocking levers relative to said cams and valves for continuously eliminating any play of said valves, said hydraulic means comprising a bearing block having cylinders therein, a plunger slidably mounted in each of said cylinders, a bearing at one end of said plunger for pivotably supporting the end of one of said rocking levers, spring means acting upon each of said plungers, oil collecting chambers not under pressure in said block, ducts connecting said cylinders with said oil collecting chambers, and a check valve disposed in each of said ducts.

2. A valve control mechanism for internal combustion engines having a cylinder head, cams and valves operated by said cams, comprising rocking levers disposed between said cams and valves, hydraulic means for adjusting the position of the rotary axis of said rocking levers relative to said cams and valves for continuously eliminating any play of said valves, said hydraulic means comprising a bearing block having cylinders therein, said bearing block being mounted such as to be in direct contact with said cylinder head, a plunger slidably mounted in each of said cylinders, a bearing at one end of said plunger for pivotably supporting the end of one of said rocking levers, spring means acting upon each of said plungers, oil collecting chambers not under pressure in said block, ducts connecting said cylinders with said oil collecting chambers, a check valve disposed in each of said ducts, and means for collecting the oil discharged from the various parts of said mechanism and for connecting said oil collecting chambers with each other.

3. A valve control mechanism for internal combustion engines having a cylinder head, cams and valves operated by said cams, comprising rocking levers disposed between said cams and valves, hydraulic means for adjusting the position of the rotary axis of said rocking levers relative to said cams and valves for continuously eliminating any play of said valves, said hydraulic means comprising a bearing block having cylinders therein, said bearing blocks comprising individual units mounted in direct contact with said cylinder head, a plunger slidably mounted in each of said cylinders, a bearing at one end of said plunger for pivotably supporting the end of one of said rocking levers, spring means acting upon each of said plungers, oil collecting chambers not under pressure in said block, ducts connecting said cylinders with said oil collecting chambers, a ball check valve not acted upon by spring pressure disposed in each of said ducts, and means for collecting the oil discharged from the various parts of said mechanism and for connecting said oil collecting chambers with each other.

4. A valve control mechanism for internal combustion engines having a cylinder head, cams and valves operated by said cams, comprising two rocking levers disposed between said cams and valves, hydraulic means for adjusting the position of the rotary axes of said rocking levers relative to said cams and valves for continuously eliminating any play of said valves, said hydraulic means comprising a bearing block for cylinders therein, a plunger slidably mounted in each of said cylinders, a bearing at one end of each of said plungers for pivotally supporting the end of each of said rocking levers, the center line of said bearing being included in a common plane extending perpendicularly to said cylinder head, the first of said valves being disposed at a greater distance from said plane than the other of said valves, spring means acting upon each of said plungers, oil collecting chambers free from pressure in said block, ducts connecting said cylinders with said oil collecting chambers, and a check valve disposed in each of said ducts.

5. A valve control mechanism for internal combustion engines having a cylinder head, cams and valves operated by said cams, comprising two rocking levers disposed between said cams and valves, hydraulic means for adjusting the position of the rotary axes of said rocking levers relative to said cams and valves for continuously eliminating any play of said valves, said hydraulic means comprising a bearing block having cylinders therein, said bearing block being mounted such as to be in direct contact with said cylinder head, a plunger slidably mounted in each of said cylinders, a bearing at one end of each of said plungers for pivotally supporting the end of each of said rocking levers, the center line of said bearings being included in a common plane extending perpendicularly to said cylinder head, the first of said valves being disposed at a greater distance from said plane than the other of said valves, spring means acting upon each of said plungers, oil-collecting chambers relieved of pressure in said block, ducts connecting said cylinders with said oil-collecting chambers, and a check valve disposed in each of said ducts.

6. A valve control mechanism for internal combustion engines having a cylinder head, cams and valves operated by said cams, comprising two rocking levers disposed between said cams and valves, hydraulic means for adjusting the position of the rotary axes of said rocking levers relative to said cams and valves for continuously eliminating any play of said valves, said hydraulic means comprising a bearing block having cylinders therein, said bearing block being mounted such as to be in direct contact with said cylinder head, a plunger slidably mounted in each of said cylinders, a bearing at one end of each of said plungers for pivotally supporting the end of each of said rocking levers, the center line of said bearings being included in a common plane extending perpendicularly to said cylinder head, the first of said valves being disposed at a greater distance from said plane than the other of said valves, the distance between said plane and the contact point of one of said levers with said first valve being greater than the distance between said plane and the contact point of one of said cams with said lever, the distance between said plane and the contact point of the other lever with said other valve being smaller than the distance between said plane and the contact point of said other lever with the other of said cams, spring means acting upon each of said plungers, oil-collecting chambers relieved from pressure in said block, ducts connecting said cylinders with said oil-collecting chambers, and a check valve disposed in each of said ducts.

References Cited in the file of this patent

UNITED STATES PATENTS

| | | |
|---|---|---|
| 1,937,932 | Woolman | Dec. 5, 1933 |
| 2,140,826 | Bettison | Dec. 20, 1938 |
| 2,158,222 | Dayton | May 16, 1939 |
| 2,178,732 | Voorhies | Nov. 7, 1939 |
| 2,484,109 | Meinecke | Oct. 11, 1949 |